Oct. 23, 1951     W. M. CRUMP     2,572,115

ADJUSTABLE POWER TAKE-OFF FOR AUTOMOTIVE VEHICLES

Filed June 16, 1950

INVENTOR.
WALLACE M. CRUMP
BY
Anderson & Muller
ATTORNEY

Patented Oct. 23, 1951

2,572,115

UNITED STATES PATENT OFFICE 2,572,115

ADJUSTABLE POWER TAKE-OFF FOR AUTOMOTIVE VEHICLES

Wallace M. Crump, Denver, Colo.

Application June 16, 1950, Serial No. 168,579

1 Claim. (Cl. 180—53)

This invention relates to improvements in power take-offs, and has reference more particularly to a power take-off attachment for tractors and automobiles.

There are on the market today many tractors, practically all of which are provided with a power take-off shaft, and in addition there is at least one popular make of automobile that is provided with a power take-off shaft terminating at the rear end thereof.

It is frequently necessary and desirable with tractors and other automotive vehicles provided with power take-off shafts to be in position to utilize the power thus made available for effecting different operations. It is sometimes desirable to take off power by means of a belt, and other times by means of mechanisms for effecting specific operations, such as operating a reciprocating saw, a post hole digger, or a circular saw.

It is the object of this invention to produce a simple and substantial power take-off mechanism that can be readily applied to any automotive vehicle provided with a power take-off shaft, but which is designed more particularly with reference to the automobile sold under the name of "Jeep," which has become very familiar and extensively used since the war.

Applicant is aware that power take-offs of various kinds have been patented, and calls attention in particular to United States Letters Patent 1,441,595 granted January 9, 1923, which shows a mechanism designed for a similar purpose.

It is the principal object of this invention to improve power take-offs of the kind shown in the above identified patent, more particularly with respect to its adjustability whereby the mechanism may be adjusted rotarily about the axis of the drive shaft, and which can then be conveniently clamped in adjusted position.

Another object of the invention is to produce a power take-off of such construction that one of the drive shafts can readily be removed and replaced by another of different length and constructed to effect a different operation or purpose.

A further object of the invention is to produce a power take-off which, in addition to the angular adjustability mentioned above, shall also be provided with a flange by means of which it can be readily attached to the frame of a tractor or other automotive vehicle.

The above and other objects that may become apparent as this description proceeds are attained by means of a construction and an arrangement of parts that will now be described in detail, and for this purpose reference will be had to the accompanying drawing in which the invention has been illustrated, and in which.

Figure 4:
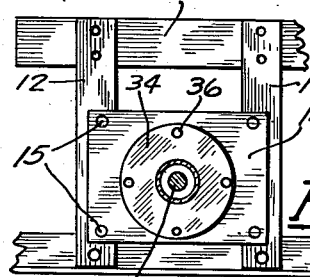
Figure 4 is a section taken on line 4—4, Figure 1.

Referring now to the drawing, reference numeral 10 designates the frame of an automotive vehicle such as a tractor, truck or Jeep, and numeral 11 designates a power take-off shaft that extends from the transmission to the rear end or to one side of the vehicle. The means illustrated for effecting a connection with the vehicle is illustrative only, and as shown in the drawing, consists of two bars 12 that are secured to the frame 10 and extend downwardly. An angle iron 13 is usually connected with the lower ends of bars 12 in the manner shown in Figures 2 and 4. In the embodiment illustrated, a plate 14 has been shown as secured to the downwardly extending bars by means of bolts or rivets 15, and this plate is provided with an opening.

The attachment that forms the subject of this invention consists of a substantially cylindrical gear housing 16 having side members 17 and 18 that are held in place by cap screws or other suitable means 19. Each of the side members is provided with a cylindrical tubular hub, one of which has been designated by reference numeral 20, and the other by reference numeral 21. The hub members may be of any desired length, but in the specific form illustrated, hub member 21 is the longer. This, however, is not an essential feature of the construction. Positioned inside of the gear housing is a worm wheel 22 which has been shown as being provided with a tubular hub 23 that extends to both sides, the ends of which are journaled in the hubs 20 and 21. In the embodiment illustrated, friction bearings have been shown for the worm wheel, but it is to be understood that antifriction bearings may be substituted if desired. Extending tangentially from the gear housing is a cylindrical member 24 in which is located the worm 25. The worm is provided with a splined or polygonal opening 26 through which the shaft 27 extends, or it may be formed integral with the shaft. Shaft 27 is mounted in suitable bearings. In the embodiment illustrated, friction bearings have been shown. The bearings are held in position by pins 28, or by other suitable means.

Figure 1:
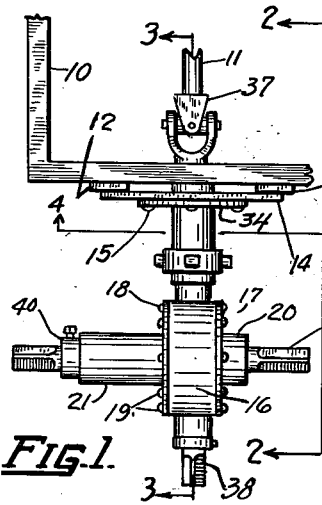
Figure 1 is a top plan view of the attachment showing a portion of an automotive vehicle frame to which the attachment is secured.
Figure 5:
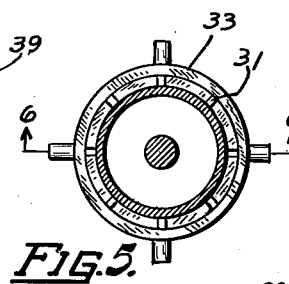
Figure 5 is a section taken on line 5—5, Figures 3 and 6.
Figure 2:
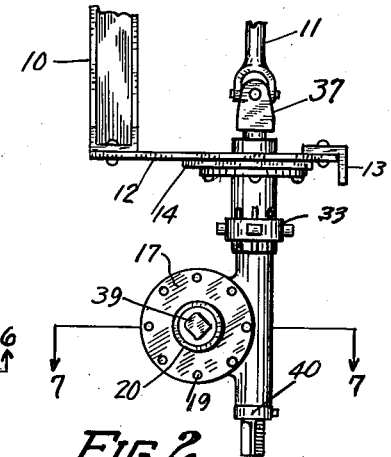
Figure 2 is a side elevation looking in the direction of arrows 2—2, Figure 1.
Figure 3:
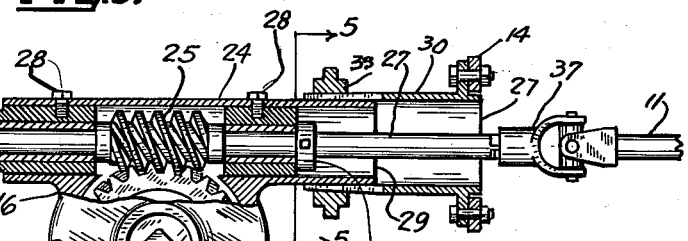
Figure 3 is a longitudinal section taken on line 3—3, Figure 1, a portion of the gear housing being shown in side elevation.

It is evident that, as far as the operation of the device is concerned, ordinary friction bearings may be employed, and for this reason the specific arrangement of bearings will not be further described. Cylindrical member 24 terminates at 29 and extends into a cylindrical sleeve 30 whose inner diameter is substantially equal to the outside diameter of member 24, as shown most clearly in Figure 6. The end of member 30 that telescopes with member 24 is provided with a number of longitudinally extending slits 31, and its outer surface is provided with taper pipe thread 32. A threaded ring 33 cooperates with the threaded surface 32, and when the ring is rotated so as to move it toward the part of the threads that have the larger diameter, the slit end will be forced against the outside of member 24 in the manner of a chuck, and will securely hold the two members in any desired adjusted position. Cylindrical member 24 may be moved longitudinally in sleeve 30 so as to facilitate adjustments with different forms of power take-offs. Sleeve 30 is provided with a flange 34 that has suitable openings 35 for the reception of securing bolts such as those indicated by reference numeral 36 in Figure 4. In the embodiment illustrated, flange 34 is bolted to plate 14, the parts being so arranged that shaft 27 will be as nearly as practicable in alignment with shaft 11. A universal joint 37 is provided for effecting a connection between shafts 11 and 27 as shown in Figures 1, 2 and 3. It will be seen that the opposite ends of shaft 27 are provided with splined or polygonal surfaces so as to facilitate connection with the universal joint or with any belt pulley, gear or other element that may be attached to them.

Let us now assume that the parts are arranged in the manner shown in the drawing, and more particularly illustrated in Figure 3, and that shaft 11 is rotated by power derived from the engine and transmission gear of the automotive vehicle. Shaft 27, when it is rotated, will impart a corresponding rotation to the worm wheel 22. Power may be taken off the end 38 of shaft 27 for high speed operation. A shaft 29 is slideably positioned in the hub of the worm wheel, and may be hexagonal in cross section, as shown in the drawing, or the interior of hub 23 and the shaft may be splined, whichever arrangement is believed to be the most desirable. If shaft 39 is slideable in worm 25, some means like collars 40 may be applied to the shaft to keep it from moving longitudinally during operation.

By rotating the gear housing 16 through an angle of 90 degrees and replacing shaft 39 with a similar shaft having an earth auger at one end, the device may be used as a post hole digger. The specific construction of the auger has not been illustrated because it merely forms one of the many attachments that may be connected with the power take-off above described.

Figure 8:
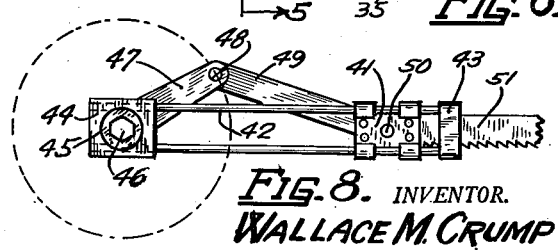
Figure 8 is a side elevation of a saw of the type used with the attachment.

One of the most popular attachments for use with a mechanism of this kind is a reciprocating saw like that illustrated in Figure 8 where a crosshead 41 is slideably connected with two parallel guide bars 42. One end of the bars is connected by transverse member 43 and the other by a casting or other member 44. Rotatably mounted in a bearing in member 44 is a tubular journal 45 having a hexagonal splined opening 46 that is adapted to receive an end of shaft 39. When shaft 39 rotates, crank arm 47 which is connected with journal 45 rotates and the crank pin 48 describes a circle like that shown by the broken line. A connecting rod 49 extends from crank pin 48 to pin 50 on crosshead 41, to which the saw 51 is attached by some suitable means such as bolts. It is clear from the above that when crank arm 47 is rotated the saw will be reciprocated and may be employed for sawing either in a horizontal or vertical plane, or in any plane angularly related to the horizontal.

It is, of course, evident that belt pulleys or sprocket wheels or winch drums may be attached to the ends of shafts 27 and 39, and therefore this power take-off may be used for many specifically different purposes.

It is not the intention to limit this invention to any particular use, as it is obvious that it may be employed for many specifically different operations, some of which have been indicated above.

Figure 6:
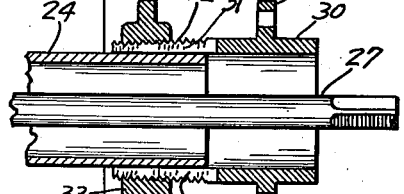
Figure 6 is a section taken on line 6—6, Figure 5.
Figure 7:
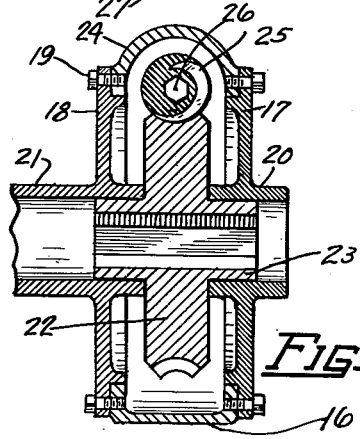
Figure 7 is a diametrical section taken on line 7—7, Figure 2.

Attention is directed in particular to the construction shown most clearly in Figures 3 and 6 by means of which the gear housing can be rotated through any desired angle and clamped in any desired rotary position. By means of the chuck arrangement shown and described, shaft 27 may be adjusted axially so as to facilitate connection with the drive shaft 11 and to obtain the proper position for best operation.

The various bearings have been shown in a general way, and it is contemplated to select the most suitable anti-friction bearings for use wherever desired.

In the specific embodiment illustrated the worm has been shown of the double thread type, but may be provided with single threads if desired.

Having described the invention, what I claim as new is:

In combination with a tractor having a wheel supported frame, a transverse member forming the rear end thereof, a transmission carried by the frame, and a power take off shaft extending from the transmission to a point adjacent the transverse frame member; a power take off and speed reduction device for transmitting power from the power take off shaft to a machine to be driven thereby, comprising a gear reduction housing having an input shaft and an output shaft projecting therefrom in right angular relation, the housing having a tubular projection through which the power input shaft extends and from which it projects, and means for removably attaching the gear reduction housing to the transverse frame member and the input shaft to the power take off shaft, comprising a sleeve having a flange forming means for effecting a rigid connection with the transverse frame member, the inside diameter of the sleeve being so related to the outside diameter of the tubular projection that the latter will have a sliding fit therein, the relative dimensions of the tubular projection, the length of the input shaft extending beyond the end thereof, the length of the sleeve and the position of the rear end of the power take off shaft being such that an operative coupling connection can be effected between the two shafts, and means for clamping the tubular projection in operative position in the sleeve.

WALLACE M. CRUMP.

REFERENCES CITED

The following references are of record in the file of this patent:

UNITED STATES PATENTS

| Number | Name | Date |
| --- | --- | --- |
| 1,086,641 | Blume | Feb. 10, 1914 |
| 1,330,869 | Harter | Feb. 17, 1920 |
| 1,441,595 | Miller | Jan. 9, 1923 |
| 1,573,359 | Ruckstell | Feb. 16, 1926 |
| 1,843,202 | Buchanan | Feb. 2, 1932 |
| 1,915,015 | Dalazer | June 20, 1933 |

FOREIGN PATENTS

| Number | Country | Date |
| --- | --- | --- |
| 888,326 | France | Dec. 9, 1943 |